United States Patent [19]
Johnson

[11] 3,941,328
[45] Mar. 2, 1976

[54] SUPPORT SHAFT APPARATUS

[76] Inventor: Dale E. Johnson, Box 231, McElhattan, Pa. 17748

[22] Filed: Apr. 15, 1975

[21] Appl. No.: 568,252

[52] U.S. Cl. .............................................. 242/68.4
[51] Int. Cl.² ....................................... B65H 17/02
[58] Field of Search ...................... 242/68.4, 72, 68

[56] References Cited
UNITED STATES PATENTS

| | | | |
|---|---|---|---|
| 2,066,659 | 1/1937 | Templeton | 242/72 |
| 2,733,022 | 1/1956 | Grody | 242/72 |
| 2,903,200 | 9/1959 | McDougall | 242/72 |
| 2,907,533 | 10/1959 | Tornberg | 242/72 |

*Primary Examiner*—Edward J. McCarthy
*Attorney, Agent, or Firm*—Laurence, Stokes & Neilan

[57] ABSTRACT

A rotating member, such as a roll of paper is supported by a pair of shafts extending into opposite ends of an axial bore in the rotating member. The shafts, which have rubber bushings which expand outwardly into tight fit within the axial bore, are constructed to enable ready removal of the shafts from the roll, for example, to change the roll.

8 Claims, 10 Drawing Figures

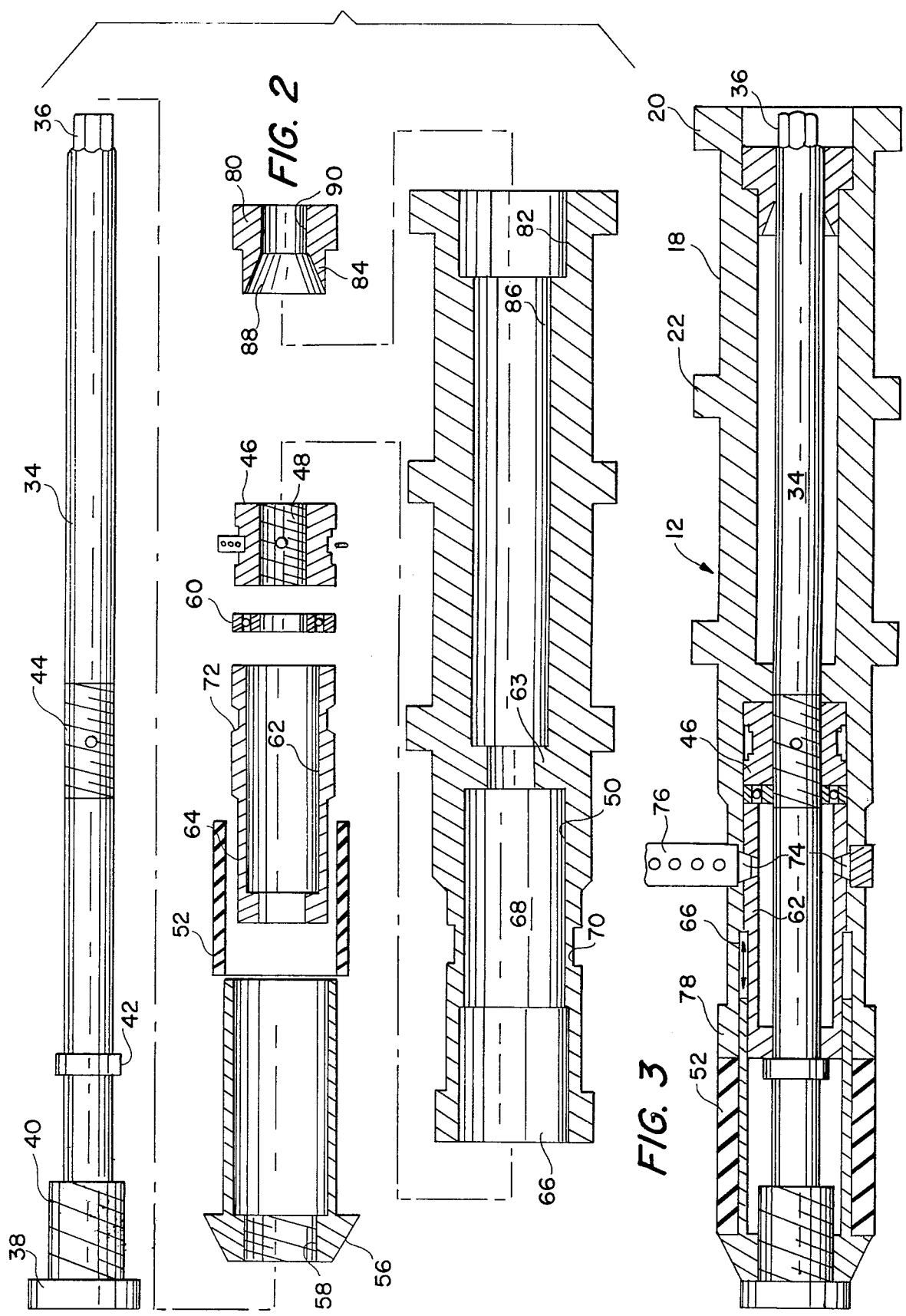

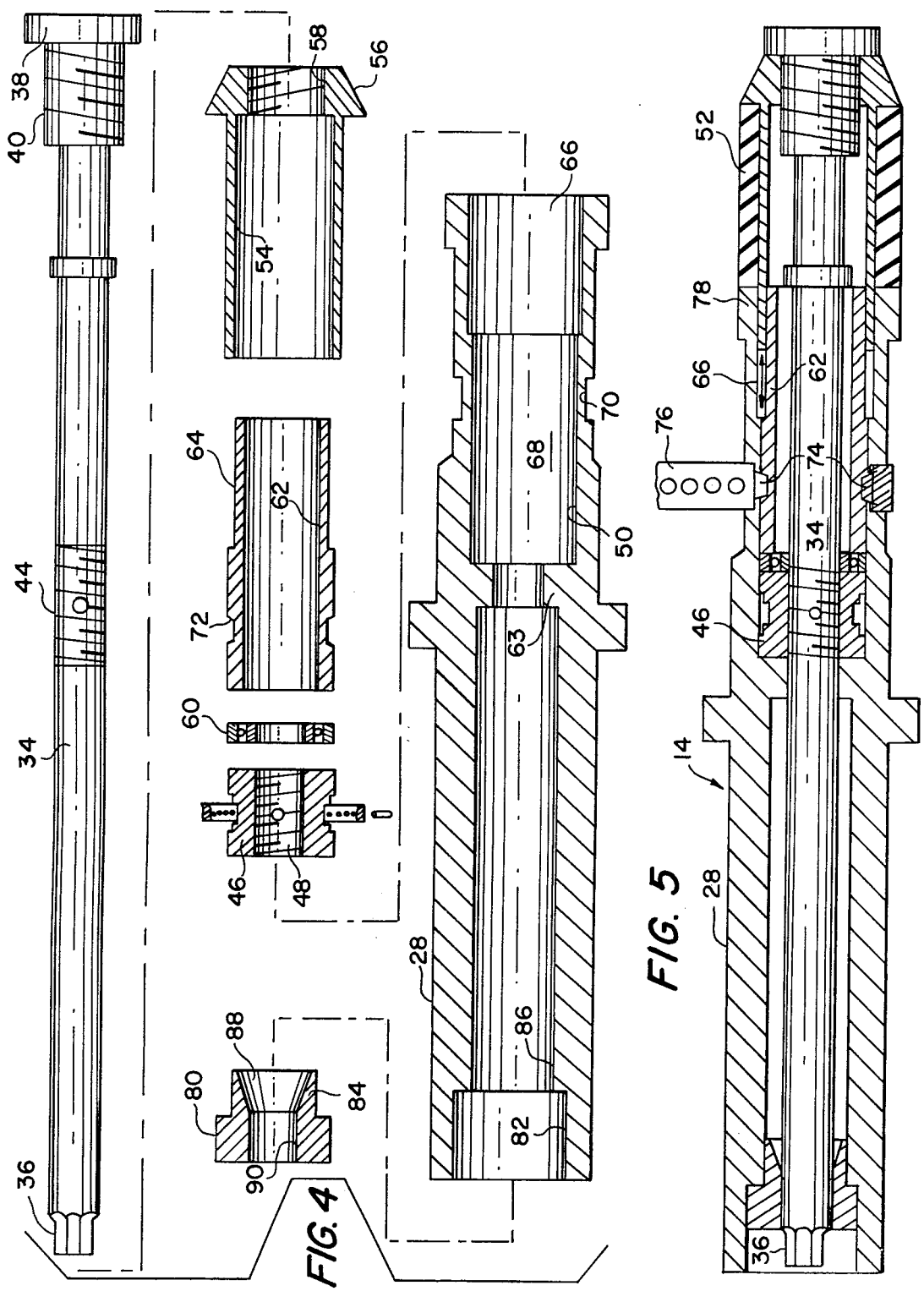

SUPPORT SHAFT APPARATUS

BACKGROUND OF THE INVENTION

The present invention relates to shafts and, more particularly, to stub arbor shafts, which shafts may be attached and detached to and from members such as large rolls supported by the shafts.

One commercially important use for such shafts is in paper mills where a plurality of rolls of paper are loaded onto a cutting machine and supported on suitable shafts while being cut into sheets. Customarily, each roll is mounted on a bearing at each end of the roll. Shafts of the subject type support the rolls on the bearings. Conventionally, one of the bearings can be reciprocated in the axial direction of the roll and the other bearing can be rotated about a vertical axis in order to align the rolls. The cutting machine runs essentially continuously and while empty rolls are being replaced, the machine is fed from other rolls. On a typical machine, there are six rolls disposed in three rows of two each.

At present it is more time-consuming and a more tedious job to repair this shaft, than the shaft of this application. The ends of the shafts, which extend into the roll, have outer annular rubber bushings. Provision is made in the shaft's construction to compress the bushings axially thereby causing them to bow outwardly into tighter fit within the roll. When the rubber bushing wears, it is necessary to take the shafts apart to replace the bushings. The prior art shafts have the further disadvantage that tools are required to fix the shafts, for example, to replace the bushings, and this entails further labor expense since it is deemed maintenance according to most union contracts, and thus should be done by the maintenance staff and not by the machine's normal work force.

In the existing prior art structure, it is necessary to almost completely disassemble the shaft in order to replace the bushing.

For example, in one prior art shaft structure, snap rings are employed which require special plyers for their removal. Then it is necessary to remove cotter pins and nuts on a rod which extends through the shaft, and then unscrew the cone. Only thereafter can the shaft be disassembled to remove the bushing. The use of snap rings is also disadvantageous since there is the possibility of snap rings coming out during use if improperly installed.

SUMMARY OF THE INVENTION

It is a primary object of the present invention to provide a new and improved support shaft arrangement for rotating rolls and the like.

Another principal object of the invention is to provide a support shaft having a replaceable rubber bushing establishing a connection with a rotating member, which bushing may be replaced with a minimum of disassembly of the apparatus.

The above and other objects, features and advantages of the invention will in part be apparent and will in part be described below. Briefly, a presently preferred embodiment of the invention comprises a roll of paper or the like which is supported by a pair of shafts extending into the hollow core of the roll. For purposes of illustration, the roll will be described as a roll of paper employed on a paper cutting machine in a paper mill. The shaft on one side of the roll, referred to as a bearing shaft, is mounted in a bearing which may be shifted with the roll in an axial direction. The shaft on the other side of the roll, referred to as a journal shaft, is supported on a bearing which conventionally can be rotated about a fixed vertical axis. The axially shiftable bearing may be mounted on a wall, and this represents the shifter side of the cutter or sheeter. The other bearing, which can be rotated about a vertical axis, is typically also mounted on a wall, called the friction side. The purpose of the journal shaft is to support the rolls and put a braking effect on the rolls through the journal shafts to prevent the paper sheets from wrinkling. For this purpose, a friction wheel is put on the journal shaft to control the roll rotation and to keep the paper sheet taut between the roll and the cutter.

The two shafts associated with each roll, although not identical with each other, are basically similar. Each shaft has a roll engaging and/or cone end which is inserted into a bore in the roll. A rubber bushing is mounted at the cone end of the shaft and the bushing may be bowed outwardly to engage the walls of the bore in the roll to provide a driving engagement between the shaft and the roll. The shafts each have axial bores with an adjustment rod extending therethrough and attached to one end, to the cone end, and being accessible from the other end of the shaft. Rotation of the adjustment rod may move the cone end axially relative to the remainder of the shaft to expand or contract the rubber bushing.

Several embodiments of different structures for facilitating removal of the annular rubber bushing from the cone end more quickly than prior art devices are illustrated and will be described in detail hereinafter. For example, in some embodiments the rubber bushing can be slipped off the cone end over an adapter section of the shaft without the adapter section being removed from position relative to the adjustment rod. As another possibility described hereinafter, the head section of the cone may be removed without disrupting the remainder of the apparatus and thereafter the rubber bushing, which has been held in place in part by the cone head, may be removed at the cone end of the apparatus.

BRIEF DESCRIPTION OF THE DRAWINGS

FIG. 2 is an exploded view partly in section of the shaft at the left side of FIG. 1, showing the manner of assembly of the bearing shaft.

FIG. 3 is a view primarily in longitudinal section showing the shaft of FIG. 2 when assembled.

FIG. 4 is an exploded view similar to FIG. 2 but of the shaft at the right side of FIG. 1.

FIG. 5 is a view primarily in longitudinal section showing the shaft of FIG. 4 when assembled.

DETAILED DESCRIPTION OF THE INVENTION

Figure 1:
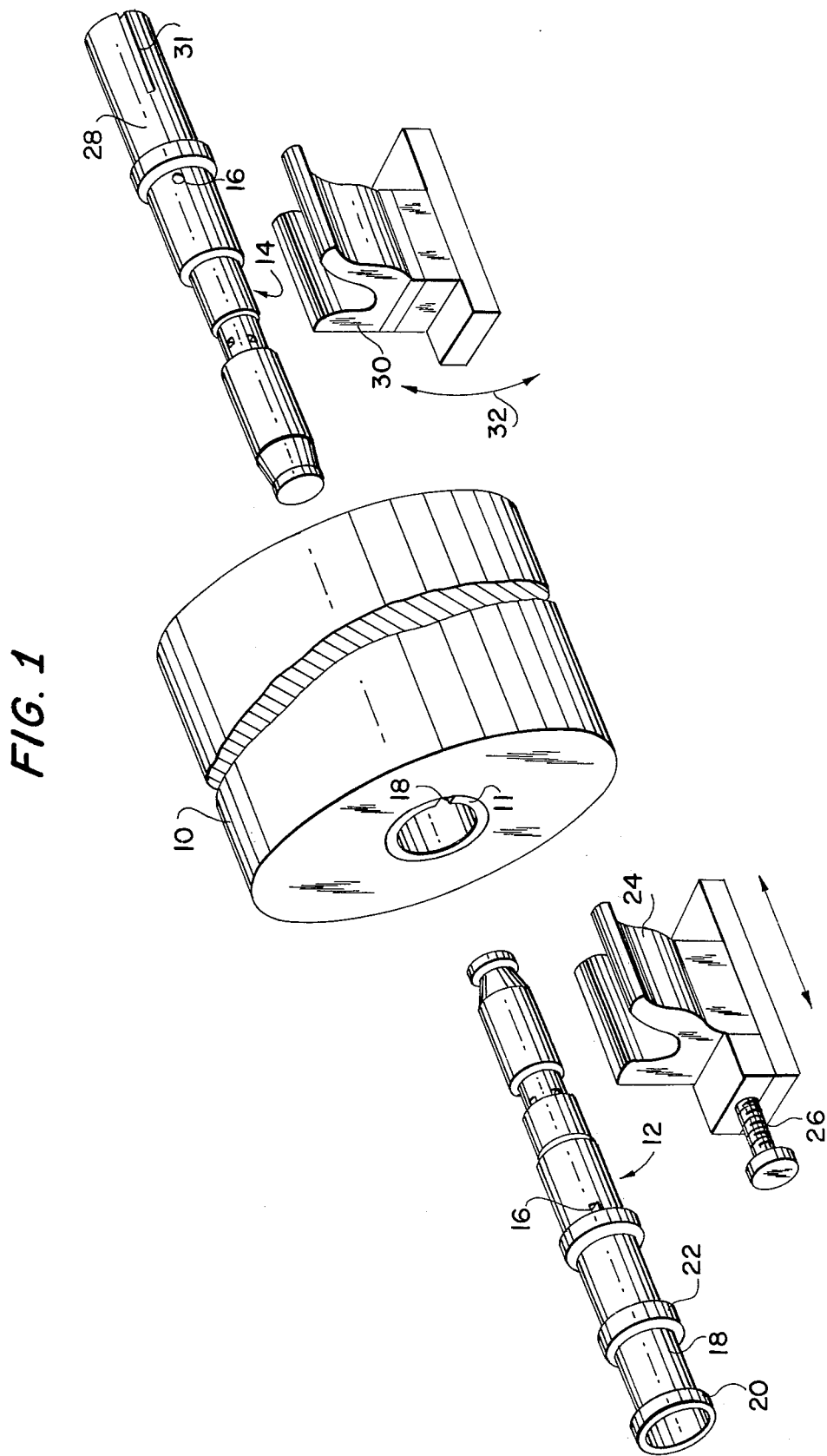
FIG. 1 is an exploded view of a roll being supported by a pair of shafts and bearings in accordance with the present invention.

Referring now to the drawings and, more particularly, to FIG. 1, reference numeral 10 designates a roll of paper or the like which has a hollow core 11. A first shaft, referred to as a bearing shaft generally designated by reference numeral 12, and a second shaft, referred to as a journal shaft, generally designated by reference numeral 14, are adapted to have their ends inserted into the hollow core 11 until keys 16 engage in complementary recesses 18 in the hollow core. The first shaft 12 has a rear end section 18 between rings 20 and 22 which is rotatably supported in a bearing 24. The bearing 24 and the shaft 12 may be reciprocated in the axial direction of roll 10 via a hand wheel 26.

The journal shaft 14 similarly has a rear section 28 mounted in a bearing 30 which is rotatable about a fixed vertical axis as represented by the arrow 32. A slot 31 at the rear of the shaft 14 permits the shaft to be splined to a friction wheel (not shown).

FIGS. 2 and 3 illustrate the construction of shaft 12 in detail. As shown therein, the shaft is hollow and an adjustment rod 34 extends through the shaft. When in place, the right hand end of the rod 34, which has a configuration of a hexagon 36, is adapted to be engaged by a suitable tool to rotate the rod. The other end of the rod comprises an enlarged head 38 and a threaded section 40. There is an adaptor stop 42 on rod 34 intermediate the threaded section 40 and a further threaded section 44 approximately at the mid-point of the rod. The purpose of the stop 42 is to push the adaptor to its seat in the shaft housing and prevent the adaptor from moving out of place. The threaded intermediate section 44 is threaded into a rod lock 46 which has internal threads 48 and is positioned in recess 50 in the shaft. The outer configuration of rod lock 46 and the inner configuration of recess 50 permit rotation of the rod lock.

An annular rubber bushing 52 is placed onto the annular skirt 54 of shaft end piece or cone 56 which is slipped onto the rod from the right hand end. There are internal threads 58 in end piece 56 for engagement with the threads 40 at the other end of rod 34. Thus, the adjustment rod may be attached to cone end piece 56, the adaptor goes over the rod next followed by a ball bearing unit 60 and the rod lock 46, which is screwed to the rod and pinned by a pin, followed by a belt that wraps around the center of the rod lock to keep the pin from falling out. The rubber bushing is slid on from right to left until it covers the cone skirt before the whole assembly is pushed into the shaft.

The adjusting rod with all the parts on it are placed into the housing as follows. An adaptor 62 is slid along the shaft 12 until one end is pushed against a stop 63, by adaptor stop 42 of adjusting rod 34. The adaptor is hollow with a circular interior bore but with a hexagonal outer surface 64. The hexagonal outer surface 64 is located within an enlarged diameter cone housing area 66 whereas the remainder of the adaptor is positioned within a smaller diameter passage 68 between recess 50 and the housing area 66 when the rod is inserted within the shaft housing. There are tapered apertures 70 in the passage 68 and corresponding tapered recesses 72 in the wall of the adaptor 62. Pins 74 extend through the tapered apertures 70 into the recesses 72 to lock the adaptor in position. A belt 76 is placed around the pins to prevent the pins from falling out.

As seen in FIG. 3, when assembled the portion of the left hand end of adaptor 62 which has a hexagonal or non-circular configuration telescopes within the skirt 54 within housing area 66 with provision for axial movement since the skirt does not extend the entire length of the housing area 66. The right hand end of the rubber bushing 52 abuts against the end 78 of the shaft, and the adaptor stop 42 contacts the end of adaptor 62. At the right hand end of the rod 34 a bushing 80 is inserted into a counterbore 82 with the reduced diameter section 84 of the bearing extending into the axial bore 86 in the shaft 12. Section 84 of the bearing has a tapered opening 88 leading to the central passage 90. The tapered section enables the rod 34 to be slipped into the bushing 80 so that the nut 36 can be passed through the bushing without pushing the bushing out of its seat when the unit is being assembled.

In operation, after the cone end of shaft 12 has been inserted into the core 11 or roll 10, the rubber bushing 52 is pushed outwardly into sealing engagement with the core 11 by rotating the adjusting nut 36 be means of a suitable tool. Because the threaded section 40 of rod 34 engage with the threads 58 of the cone head 56, this causes the skirt to move to the right so that the rubber bushing 52 is compressed between the cone end 56 and the end 78 of the shaft. There would be a tendency for the skirt 54 to rotate with rod 34, but this is prevented due to the non-circular configuration of the inner surface of skirt 54 and the complementary configuration of the section 64 of the adaptor 62. As indicated above, in the illustrated embodiment skirt 54 and end section 64 have a hexagonal configuration. This prevent rotation of the skirt when the rod 34 is being rotated to either expand or contract the rubber bushing 52. Adaptor 62 in turn is prevented from rotating by the tapered pins 74 which connect the adaptor to the shaft and by the hexagonal shape of the adaptor in area 68 of the housing (see FIG. 2).

FIGS. 4 and 5 illustrate the details of the journal shaft 14. Since shaft 14 is basically similar in construction to the bearing shaft 12, the same reference numerals are employed in FIGS. 4 and 5 to designate corresponding parts to those described previously in connection with shaft 12. The manner of connecting shaft 14 to the roll 10 via expansion of the rubber bushing 52 is the same as described previously in connection with shaft 12.

Figure 6:
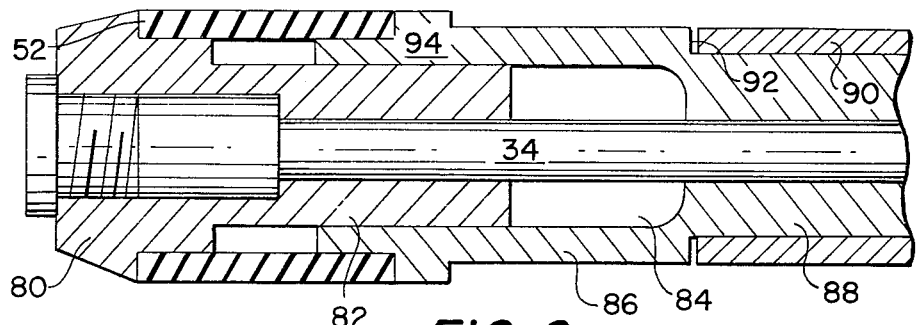
FIG. 6 is a view in longitudinal cross section of a portion of another embodiment of the invention showing a modified shaft end structure for supporting an annular rubber bushing.

FIG. 6 illustrates a modified shaft end structure in accordance with another embodiment of the invention. In this embodiment there is an end piece or cone 80 with a tubular extension or skirt 82 which telescopes within a noncylindrical, for example, a hexagonal passage 84 in an adaptor 86. The adaptor has a smaller diameter tubular extension 88 which telescopes within a housing 90 that is slightly shorter than the housing of the previously described embodiments. As shown, the adaptor has an annular abutment lip 92 which contacts the outer end of housing 90.

The outer configuration of extension 88 and the complementary shape of the surrounding surface of housing 90 are noncylindrical so that the adaptor does not rotate in housing 90. In view of the contact between the end of housing 90 and the surface 92 of the adaptor, pulling forces generated when a rod 34 is tightened to expand the rubber bushing 52 outwardly are not transmitted to the pins which lock the adaptor to the housing. The pins of this embodiment are comparable to pins 74 and are now shown in this embodiment.

When an adjustment rod 34 is rotated to draw the end piece 80 towards the right as seen in FIG. 6, the rubber bushing 52 is deformed outwardly into locking engagement within roll 10.

Figure 7:
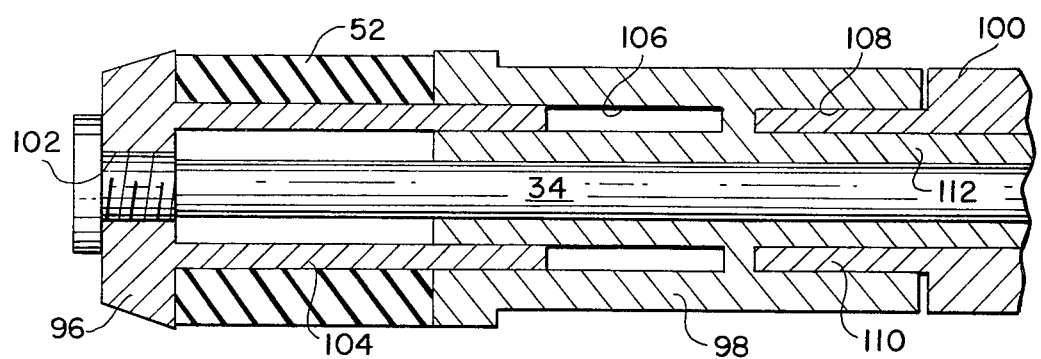
FIG. 7 is a view similar to FIG. 6 of another embodiment of the invention.

FIG. 7 illustrates another modified shaft end structure which comprises an end piece 96, and adaptor 98, and a housing 100. End piece 96 has threads 102 to engage the threads of an adjustment rod 34. The end piece also has a tubular extension or skirt 104 whose end telescopes within a slot 106 in adaptor 98. Slot 106 is noncircular as viewed in transverse cross section. A similar slot 108 in adaptor 98 facing the other direction receives a thin extension 110 of housing 100. In this manner, pulling forces are not transmitted to the pins (not shown) fastening the housing 100 to the small diameter tubular extension 112 of the adaptor.

It will be appreciated that various other constructions of similar nature permitting telescoping movement between the end piece and the adaptor with provision for the adaptor and the housing to have abuting inter-engagement are possible within the scope of the invention.

Figure 8:
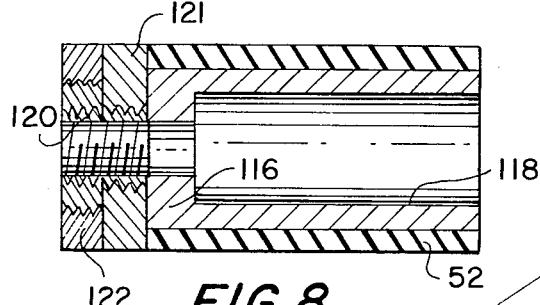
FIG. 8 is a longitudinal cross sectional view of a modified shaft end structure in accordance with another embodiment of the invention wherein the rubber bushing may be readily removed.

FIG. 8 illustrates a modified end piece which might be used, for example, with the shafts of the FIG. 1 embodiment. This end piece has the advantage that the rubber bushing may be removed and replaced without taking the entire shaft apart. An end piece 116, has a tubular extension or skirt 118 and at one end a smaller threaded extension 120 which has both internal and external threads. During assembly a rubber bushing 52 is placed onto the tubular extension 118 starting from the left side. Then an abutment member 121 is threaded onto the external threads of extension 120 followed by a lock nut 122. Should it become necessary to replace the rubber bushing 52, the adjustment rod 34 is loosened releasing pressure of rubber bushing so that lock nut 122 and abutment 121 may be screwed off permitting the bushing 52 to be slipped off of the tubular extension 118 and over the end 38 of the rod 34 (FIG. 2).

Figure 9:
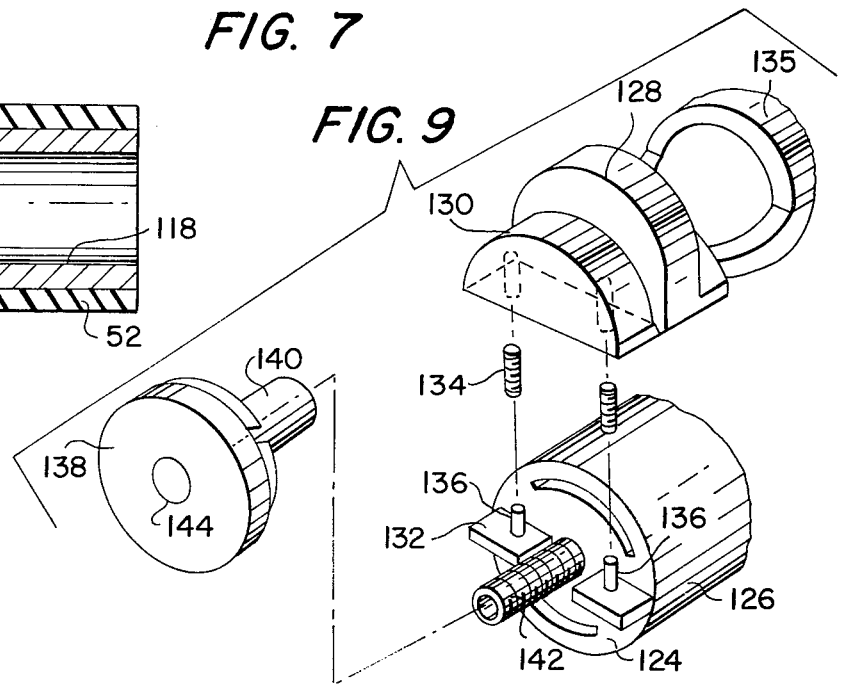
FIG. 9 is an exploded view of the end of the shaft in accordance with another embodiment of the invention which is designed for ready removal of the rubber bushing without disassembling the main portion of the shaft unit.

FIG. 9 illustrates another embodiment of the invention designated to facilitate removal of a rubber bushing without disassembling the entire shaft. An end piece 124 has a tubular extension or skirt 126 to engage the adaptor. A rubber bushing (not shown) is intended to be slipped onto the tubular extension 126. For holding the bushing in place a spring loaded retaining member having an abutment 128 which projects above the surface of tubular extension 126 and a housing 130 is attached to support plates 132 on the end piece, with springs 134 disposed in the housing and positioned upon pins 136. An annular steel cap 135 has an arcuate groove for receiving and protecting the edge of the rubber bushing. The back of cap 135 contacts the abutment 128. An end cap 138 is threaded onto threaded extension 142 of the end piece. An adjustment rod (not shown) is intended to extend through the central opening 144 in the cap 138 and through threaded extension 142 of the end piece.

Figure 10:
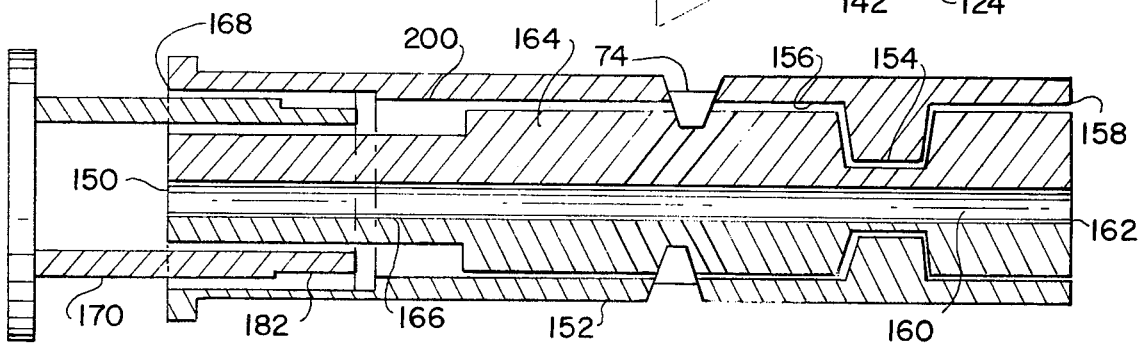
FIG. 10 is a longitudinal cross sectional view of another embodiment of the invention.

FIG. 10 illustrates another embodiment of the invention which includes an adaptor 150 disposed in a housing 152. Housing 152 has a noncircular passageway 154 between spaced chambers 156 and 158. The adaptor 150 has a short, small diameter intermediate tubular portion 160 disposed in passageway 154. The adaptor has a larger diameter right end section 162. When turned 90° from the position illustrated in FIG. 10, the end section 162 may be moved axially in the passageway 154 in the housing. When the end section 162 is in the position shown it cannot be moved axially since its side contacts the adjacent walls of chamber 158. The remainder of adaptor 150 comprises a larger diameter central portion 164 received within chamber 156 in the housing 152 and a left end comprised on a small height octagonal or other noncircular cross section end piece 166 which projects into a chamber 168 in the housing.

When the shaft is tightened, an octagonal cone skirt 182 slides onto the end piece 166. This helps to prevent the adaptor from turning when the shaft is in use. This also prevents turning pressure from being put on the pin 74 holding the adaptor in the housing. If there were no locking action to keep the adaptor from turning, the forces could snap the pins.

End piece 166 projects into cone skirt 170. The interior of the cone skirt is octangonal or other noncircular shape. The exterior of cone skirt 170 is circular, so it can be turned in circular chamber 168 during shaft assembly and disassembly. When the shaft is tightened an octagonal end section 182 of the cone skirt slides to the right on end piece 166 into an octagonal chamber 200 in housing 152, which is no wider than the section 182 of cone skirt. When cone skirt section 182 enters housing chamber 200, the end piece 166, the cone skirt, and the housing become locked together. If for example, the cone skirt is about 5 inches long, about 1 inch at the end section 182 is octagonal. The other 4 inches is round. When octagonal section 182 reaches its limit to travel to the right, it meshes with an octagonal chamber 200. AT the same time the interior octagonal shape of cone skirt 170 is in engagement with the complementarily shaped outer surface of end piece 166. This is an added safety feature of the invention that helps to prevent the adaptor from turning in the shaft housing. This locking effect minimizes the forces being placed upon the pins 74 holding the adaptor in the housing from turning. If for example in the case of a journal shaft, one puts friction on the housing of the shaft through a friction wheel to keep the sheet tight (see FIG. 1). Key 16 that is engaged in recess 18 receives pressure as the roll rotates against the braking effect. The rubber bushing also receives the same pressure because its the driving engagement. If recess 18 was to tear out letting key 16 rotate (this happens when the axil bore of the roll is a fiber core) the rubber bushing would try to rotate with the roll causing the cone skirt to also turn. The cone skirt would turn the adaptor which would shear the pins. But the locking action that prevents the internal parts from turning when the cone skirt moves to the right in FIG. 10 prevents this from happening. Thus, if the axil bore tears out and the roll rotates on the shaft the worst that can happen is damage to the rubber bushing and the core itself. In the case of a steel core this safety feature would not be needed.

From the foregoing description, it will be appreciated that the adaptor cannot be assembled the wrong way beacuse only one end is configured to mesh with the cone skirt.

While presently preferred embodiments of the invention have been shown and described with particularity, various changes may readily suggest themselves to those of ordinary skill in the art upon being apprised of the invention. For example, in view of machining problems the housing might be manufactured in two pieces which are subsequently bonded together. The invention can also be utilized with a thrust ball bearing. The disclosed embodiments are to be taken as illustrative only, and it is intended to encompass all changes and modifications that all within the scope and spirit of the appended claims.

I claim:

1. Apparatus for insertion into an axial bore in a rotating member, comprising a shaft housing, an adaptor having a portion disposed within said housing, an end piece having a portion in sliding engagement with said adaptor, a deflectable rubber bushing disposed about said end piece, and adjustment rod extending through said housing, said adaptor and said end piece and having an end portion contacting said end piece, means to prevent inadverent movement of said adaptor from within said housing, said adaptor being disposed essentially completely within said housing, and said housing being provided with a chamber for the reception of a portion of said end piece in telescoping engagement with said adaptor.

2. Apparatus for insertion into an axial bore in a rotating member, comprising a shaft housing, an adaptor having a portion disposed within said housing, an end piece having a portion in sliding engagement with said adaptor, a deflectable rubber bushing disposed about said end piece, an adjustment rod extending through said housing, said adaptor and said end piece and having an end portion contacting said end piece, means to prevent inadverent movement of said adaptor from within said housing, and a rod lock provided in a recess in said housing adjacent one end of said adaptor, said adjustment rod passing through said rod lock and having threads threadably engaging said rod lock.

3. Apparatus for insertion into an axial bore in a rotating member, comprising a shaft housing, an adaptor having a portion disposed within said housing, an end piece having a portion in sliding engagement with said adaptor, a deflectable rubber bushing disposed about said end piece, an adjustment rod extending through said housing, said adaptor and said end piece and having an end portion contacting said end piece, means to prevent inadverent movement of said adaptor from within said housing, and said housing having a reduced thickness portion having an end in abutting engagement with a portion of said adaptor.

4. Apparatus according to claim 3, wherein said adaptor is provided with a slot, and said housing having an end portion extending into said slot.

5. Apparatus for insertion into an axial bore in a rotating member, comprising a shaft housing, an adaptor having a portion disposed within said housing, an end piece having a portion in sliding engagement with said adaptor, a deflectable rubber bushing disposed about said end piece, an adjustment rod extending through said housing, said adaptor and said end piece and having an end portion contacting said end piece, means to prevent inadverent movement of said adaptor from within said housing, a threaded extension on said end piece, and an abutment threadably secured on said threaded extension to prevent removal of said rubber bushing.

6. Apparatus for insertion into an axial bore in a rotating member, comprising a shaft housing, an adaptor having a portion disposed within said housing, an end piece having a portion in sliding engagement with said adaptor, a deflectable rubber bushing disposed about said end piece, an adjustment rod extending through said housing, said adaptor and said end piece and having an end portion contacting said end piece, means to prevent inadverent movement of said adaptor from within said housing, an abutment member connected to said end piece to normally prevent removal of said rubber bushing, and spring means normally biasing said abutment member to operative position and permitting depression of said abutment member to allow removal of said rubber bushing.

7. Apparatus according to claim 6, wherein said end piece telescopes within said adaptor, said adaptor having another end portion disposed within said housing.

8. Apparatus for insertion into an axial bore in a rotating member, comprising a shaft housing, an adaptor having a portion disposed within said housing, an end piece having a portion in sliding engagement with said adaptor, a deflectable rubber bushing disposed about said end piece, an adjustment rod extending through said housing, said adaptor and said end piece and having an end portion contacting said end piece, means to prevent inadverent movement of said adaptor from within said housing, a pair of chambers and a noncircular passageway between said chambers provided in said housing, said adaptor having a first end portion disposed in one of said chambers, an intermediate portion within said passageway and a second end portion within the other chamber, said second end portion in one orientation passing through said passageway and in another orientation preventing retraction through said passageway, and said first end portion being in sliding engagement with said end piece.

* * * * *